US011348387B2

(12) United States Patent
Peng et al.

(10) Patent No.: US 11,348,387 B2
(45) Date of Patent: May 31, 2022

(54) SMART MANAGEMENT DEVICE, LOCK, AND IDENTIFICATION METHOD

(71) Applicants: BEIJING XIAOMI MOBILE SOFTWARE CO., LTD., Beijing (CN); YUNDING NETWORK TECHNOLOGY (BEIJING) CO., LTD., Beijing (CN)

(72) Inventors: Binghui Peng, Beijing (CN); Ming Li, Beijing (CN)

(73) Assignees: BEIJING XIAOMI MOBILE SOFTWARE CO., LTD., Beijing (CN); YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 29 days.

(21) Appl. No.: 16/910,033

(22) Filed: Jun. 23, 2020

(65) Prior Publication Data

US 2020/0410795 A1  Dec. 31, 2020

(30) Foreign Application Priority Data

Jun. 27, 2019  (CN) .......................... 201910566624.2

(51) Int. Cl.
*G07C 9/00* (2020.01)
*H04L 9/08* (2006.01)

(52) U.S. Cl.
CPC ........ *G07C 9/00309* (2013.01); *H04L 9/0822* (2013.01); *H04L 9/0825* (2013.01);
(Continued)

(58) Field of Classification Search
CPC ...... G07C 9/00309; G07C 2009/00365; G07C 2009/00412; H04L 9/0822; H04L 9/0825
See application file for complete search history.

(56) References Cited

U.S. PATENT DOCUMENTS 9,162,648 B1 * 10/2015  Weng ................. G07C 9/00309
10,108,272 B1 * 10/2018  DeBates .............. G06F 1/1694
(Continued)

FOREIGN PATENT DOCUMENTS

CN  104917614 A   9/2015
CN  107978047 A   5/2018
(Continued)

OTHER PUBLICATIONS

Extended European Search Report in Application No. 20182450.5, dated Nov. 18, 2020.
(Continued)

*Primary Examiner* — Nabil H Syed
(74) *Attorney, Agent, or Firm* — Syncoda LLC; Feng Ma

(57) ABSTRACT

A smart management device identification method includes: sending, by a smart management device, an activation request to a smart lock device, wherein the activation request is used to verify validity of the smart management device; in response to information indicating that the smart management device is valid, receiving, by the smart management device, an access control key from the smart lock device, wherein the access control key is generated according to a master key of the smart lock device and an identifier of the smart management device; and requesting, by the smart management device, the smart lock device to perform a state switching operation using the access control key.

8 Claims, 8 Drawing Sheets

(52) U.S. Cl.
CPC .............. *G07C 2009/00365* (2013.01); *G07C 2009/00412* (2013.01)

(56) References Cited

U.S. PATENT DOCUMENTS

| | | | | |
|---|---|---|---|---|
| 10,521,984 | B1* | 12/2019 | Johansson | G07C 9/00309 |
| 2016/0254904 | A1* | 9/2016 | Hjelm | H04L 9/006 |
| | | | | 713/155 |
| 2017/0236343 | A1* | 8/2017 | Leboeuf | H04L 9/0825 |
| | | | | 340/5.61 |
| 2020/0099522 | A1* | 3/2020 | Yang | B60R 25/241 |

FOREIGN PATENT DOCUMENTS

| | | |
|---|---|---|
| CN | 108551455 A | 9/2018 |
| CN | 109493488 A | 3/2019 |
| CN | 109523664 A | 3/2019 |
| EP | 3657370 A1 | 5/2020 |

OTHER PUBLICATIONS

Anonymous: "Key derivation function—Wikipedia", May 30, 2019, XP055746656.

CN 1st Office Action in Application No. 201910566624.2, dated Dec. 27, 2021.

Title: Modern Cryptography, by Luo Fang et al., p. 187, Wuhan University Press, release date of Apr. 30, 2017.

* cited by examiner

SMART MANAGEMENT DEVICE, LOCK, AND IDENTIFICATION METHOD

CROSS-REFERENCE TO RELATED APPLICATION

This application claims priority to Chinese Patent Application No. 201910566624.2 filed on Jun. 27, 2019, the disclosure of which is hereby incorporated by reference in its entirety.

BACKGROUND

Access control cards have many applications, such as community personnel management, company employee attendance management, etc.

SUMMARY

The present disclosure generally relates to smart access control technologies, and more particularly, to a smart management device identification method, a smart management device, and a smart lock device.

According to a first aspect of the present disclosure, there is provided a smart management device identification method, including:

sending, by a smart management device, an activation request to a smart lock device, wherein the activation request is used to verify validity of the smart management device;

in response to information indicating that the smart management device is valid, receiving, by the smart management device, an access control key from the smart lock device, wherein the access control key is generated according to a master key of the smart lock device and an identifier of the smart management device; and requesting, by the smart management device, the smart lock device to perform a state switching operation using the access control key.

According to a second aspect, there is provided a smart management device identification method, including:

receiving, by a smart lock device, an activation request sent from a smart management device, and performing authentication on the activation request;

in response to an authentication result indicating that the activation request is authenticated, sending, by the smart lock device, an access control key to the smart management device;

receiving a state switching instruction generated by the smart management device using the access control key, and obtaining, by the smart lock device, the access control key of the smart management device and performing authentication on the access control key; and in response to a result indicating that the authentication on the access control key is passed, performing, by the smart lock device, a state switching operation.

According to a third aspect, there is provided a smart management device, including:

a processor;

memory for storing instructions executable by the processor;

wherein the processor is configured to:

send an activation request to a smart lock device, wherein the activation request is used to verify validity of the smart management device;

in response to information indicating that the smart management device is valid, receive an access control key from the smart lock device, wherein the access control key is generated according to a master key of the smart lock device and an identifier of the smart management device; and request the smart lock device to perform a state switching operation using the access control key.

According to a fourth aspect, there is provided a smart lock device, including:

a processor;

memory for storing instructions executable by the processor;

wherein the processor is configured to:

receive an activation request sent from a smart management device, and perform authentication on the activation request;

in response to an authentication result indicating that the activation request is authenticated, send an access control key to the smart management device;

receive a state switching instruction generated by the smart management device using the access control key, and obtain the access control key of the smart management device and perform authentication on the access control key; and in response to a result indicating that the authentication on the access control key is passed, perform a state switching operation.

According to a fifth aspect, there is provided a non-transitory computer-readable storage medium, wherein when instructions in the storage medium are executed by a processor of a smart management device, the smart management device performs a smart management device identification method, the method including:

sending, by a smart management device, an activation request to a smart lock device, wherein the activation request is used to verify validity of the smart management device;

in response to information indicating that the smart management device is valid, receiving, by the smart management device, an access control key from the smart lock device, wherein the access control key is generated according to a master key of the smart lock device and an identifier of the smart management device; and requesting, by the smart management device, the smart lock device to perform a state switching operation using the access control key.

According to a sixth aspect, there is provided a non-transitory computer-readable storage medium, wherein when instructions in the storage medium are executed by a processor of a smart lock device, the smart lock device performs a smart management device identification method, the method including:

receiving, by a smart lock device, an activation request sent from a smart management device, and performing authentication on the activation request;

in response to an authentication result indicating that the activation request is authenticated, sending, by the smart lock device, an access control key to the smart management device;

receiving a state switching instruction generated by the smart management device using the access control key, and obtaining, by the smart lock device, the access control key of the smart management device and performing authentication on the access control key; and in response to a result indicating that the authentication on the access control key is passed, performing, by the smart lock device, a state switching operation.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain principles of various embodiments of the disclosure.

DETAILED DESCRIPTION

Figure 1:
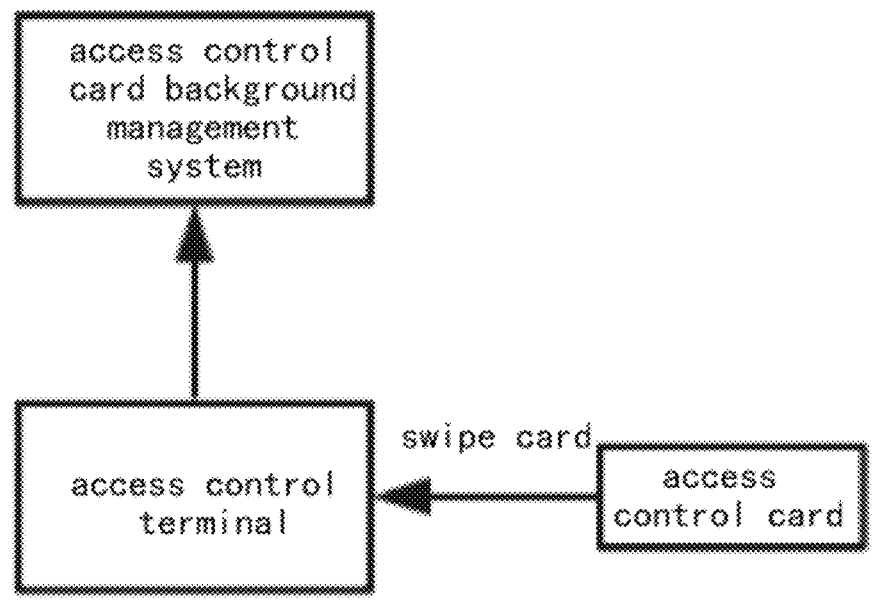
FIG. 1 is a schematic diagram showing a working principle of an access control.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program.

It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM).

It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

FIG. 1 shows an access control management system, including an access control card background management system, an access control terminal and a physical access control card. The physical access control card generally uses the low cost Mifair card. This type of cards typically have storage and logic encryption capabilities, but no data calculation capabilities. As such, these cards are less secure and have the risk of being copied.

Figure 2:
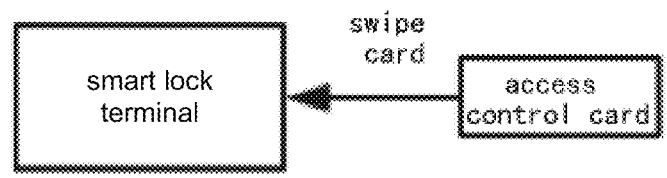
FIG. 2 is a schematic diagram showing another working principle of a smart access control.

The access control terminal and access control cards are connected together through a wired network to realize operations such as adding, deleting, and updating the access control cards. In addition to the traditional access control application scenarios, with the popularization of smart door locks, the application of access control cards on smart door locks (as shown in FIG. 2) is becoming more and more common. Many smart lock manufacturers use more secure CPU cards as access control cards for smart locks. The CPU cards have data storage capabilities, logical encryption capabilities and computing capabilities, which can ensure that the cards are not copied at the physical level.

Figure 3:
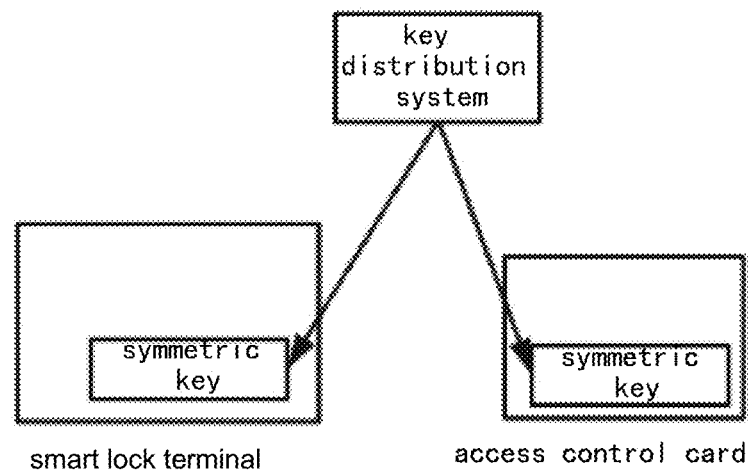
FIG. 3 is a schematic diagram showing a principle of presetting the symmetric keys before the smart access control card leaves the factory.
Figure 4:
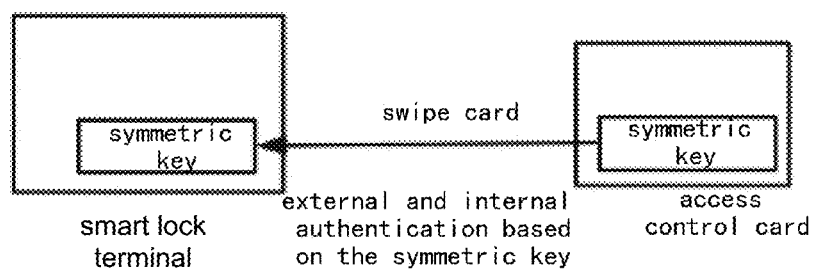
FIG. 4 is a schematic diagram showing external and internal authentication of the symmetric keys during the use of the smart access control card.

Before mainstream smart locks and access control cards leave the factory, the same symmetric keys are built in the smart locks and the access control cards to complete the binding relationships, as shown in FIG. 3. In use, the same symmetric keys are used for internal and external authentication, as shown in FIG. 4. If the authentication is passed, the cards are considered valid and an unlock operation can be performed.

In these scenarios, the symmetric keys required in the authentication process are preset before the access control cards leave factory, and if the cards are lost, new cards cannot be added.

Figure 5:
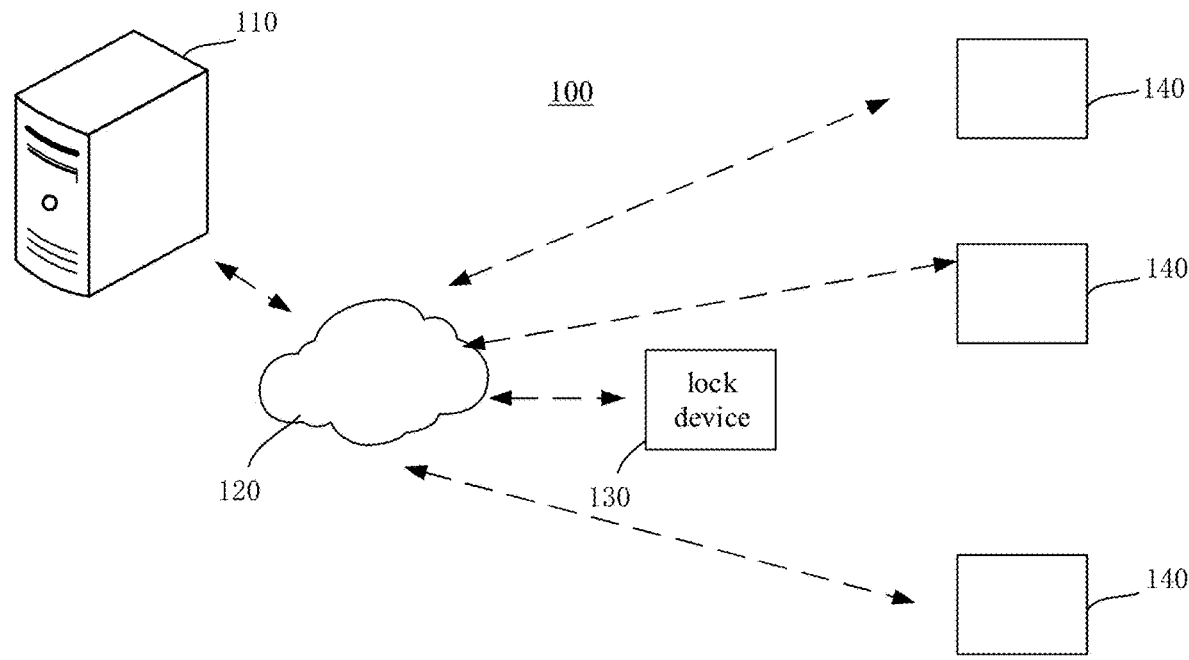
FIG. 5 is a schematic diagram of an application scenario of a security control system according to some embodiments of the present disclosure.

FIG. 5 is a schematic diagram of an application scenario of a security control system according to some embodiments of the present disclosure.

The security control system is a system used for permitting authorized persons to enter or exit a particular area, notifying security personnel of attempts to gain unauthorized access, or maintaining records of security control system activities, or the like.

As an example, the security control system may be a smart lock control system. The smart lock control system can control a smart lock. The smart lock can be an access management device (for example, door lock, garage lock, and so on) in public areas, such as factory areas, office buildings, schools, hospitals, residential communities, or the smart lock can be a security device in private areas, such as residential houses, garages, safe boxes, lockers, and so on. As shown in FIG. 5, the smart lock control system 100 may include at least a server 110, a network 120, a smart lock device 130 (an example of security device) and one or more smart management devices 140.

The server 110 may process data and/or signals related to the smart lock device 130 to perform one or more functions described in the present disclosure. In some embodiments, the server 110 may include one or more processors to process related data and/or information. For example, the server may generate a certificate for a smart management device. In some embodiments, the server 110 may be a single server or a server group. The server farm may be centralized or distributed (for example, the server 110 may be a distributed system). In some embodiments, the server 110 may be a local server or a remote server. In some embodiments, the server 110 may be implemented on a cloud platform. To give just one example, the cloud platform may include a private cloud, a public cloud, a hybrid cloud, a community cloud, a distributed cloud, between clouds, multiple clouds, etc., or any combination of the above examples. In some embodiments, the server 110 may be implemented on a computing device. In some embodiments, the server 110 may be implemented on a mobile device.

The network 120 may be used for the exchange of information and/or data. One or more components (the server 110, the smart lock device 130, and the smart management device 140) in the system can send information/data to other components through the network 120. In some embodiments, the network 120 may be any one or combination of a wired network or a wireless network. For example, the network 120 may include a cable network, a wired network, a fiber optic network, a telecommunications network, an intranet, the Internet, a local area network (LAN), a wide area network (WAN), a wireless local area network (WLAN), a metropolitan area network (MAN), a public switched telephone Network (PSTN), a General Packet Radio Network (GPRS), a mobile phone network, a Bluetooth network, a ZigBee network, a near field communication (NFC) network, a narrowband Internet of Things (NB-IoT/LoRa), or any combination of the above examples. In some embodiments, the network 120 may include one or more network access points. For example, the network 120 may include wired or wireless network access points, such as base stations and/or Internet exchange points, and so on. Through the access points, one or more components of the system 100 may be connected to the network 120 to exchange data and/or information.

The smart lock device 130 may be, for example, a door lock, or a garage lock or the like in public areas, or a lock used in residential houses, private garages, safe boxes. The smart lock device 130 may issue an access control key for each smart management device 140. When a user uses the smart management device 140 to try to gain access to public areas or private areas, the smart lock device 130 may receive the access control key from the smart management device 140 to decide whether to accept or reject the access request.

The smart management device 140 may be in the form of a physical card, and a user may swipe the card when the user wishes to gain access to a particular area. For example, the smart management device 140 may be a key, a knob, an integrated circuit (IC) card, an access card, or the like.

Alternatively, the smart management device 140 may be a device in which an application having the function of access control management is installed. Under such condition, the smart management device 140 may be considered as a virtual card. For example, the smart management device 140 may be a desktop computer, a notebook computer, a smart phone, a Personal Digital Assistance (PDA), a tablet computer, a handheld game console, smart glasses, a smart watch, a wearable device, a virtual display device, a display enhancement device, or any combination thereof. There may be one or more smart management devices 140 in the system 100. Each of the smart management devices 140 may be used by a user or an administrator of the smart lock device 130. Multiple smart management devices 140 can communicate with the server 110, and multiple smart management devices 140 can also exchange data with other devices in the security control system 100 through the network.

In some embodiments, the smart management devices 140 may communicate with the smart lock device 130 directly or indirectly, for example, via near field communication (NFC), Bluetooth, WiFi, or LAN, or the server.

For example, the smart management device 140 may be a mobile terminal, a wearable device or a card having a NFC function, and authentication may be performed between the smart management device 140 and the smart lock device 130 via NFC, or keys or certificates may be transferred via NFC.

As another example, the smart management device 140 may be a mobile terminal, a wearable device or a Bluetooth key having a Bluetooth function, and authentication may be performed between the smart management device 140 and the smart lock device 130 via NFC, or keys or certificates may be transferred via Bluetooth communication.

If authentication is passed, a prompt for unlocking the lock device 130 may be displayed on the smart management device 140, and a user may tap to unlock the lock device 130. Alternatively, if the authentication is passed, the lock device 130 may be automatically unlocked.

In addition, if the smart management device 140 is a device having a screen, information regarding the lock device 130 or information regarding the smart management device 140 may be shown on the screen of the smart management device 140, for example, state of the lock device 130 (whether the lock device 130 works normally), history regarding allowed or rejected access of the smart management device 140, or the like.

In some embodiments, each of the server 110, the smart lock device 130, and the smart access management devices 140 may be provided with a storage device, or an independent storage device may be separately provided in the smart lock control system 100 for storing data and/or instructions. For example, the server 110 may have an integrated storage device, or may also have an independent storage device (such as a big data server). In this case, the server 110 can access the storage device through the network 120. In some embodiments, the storage device may include mass storage, removable memory, volatile read-write memory, random access memory, read-only memory (ROM), and so on, or any combination of the above examples.

Exemplary mass storage may include magnetic disk, optical disk, solid state drive, and so on. Exemplary removable memory may include flash disk, floppy disk, optical disk, memory card, compact hard disk, magnetic tape, and the like. Exemplary volatile read-only memory may include random access memory (RAM). Exemplary random-access memory may include dynamic random access memory (DRAM), double data rate synchronous dynamic random access memory (DDRSDRAM), static random access memory (SRAM), thyristor random access memory (T-RAM), and zero-capacitance memory (Z-RAM), and so on. Exemplary read-only memory may include masked read-only memory (MROM), programmable read-only memory (PROM), erasable programmable read-only memory (EPROM), electrically erasable programmable read-only memory (EEPROM), compact hard disk read-only memory (CD-ROM) or digital multi-function hard disk read-only memory, and so on. In some embodiments, the storage device may also be implemented on a cloud platform. To give just one example, the cloud platform may include a private cloud, a public cloud, a hybrid cloud, a community cloud, a distributed cloud, between clouds, multiple clouds, etc., or any combination of the above examples.

Figure 6:
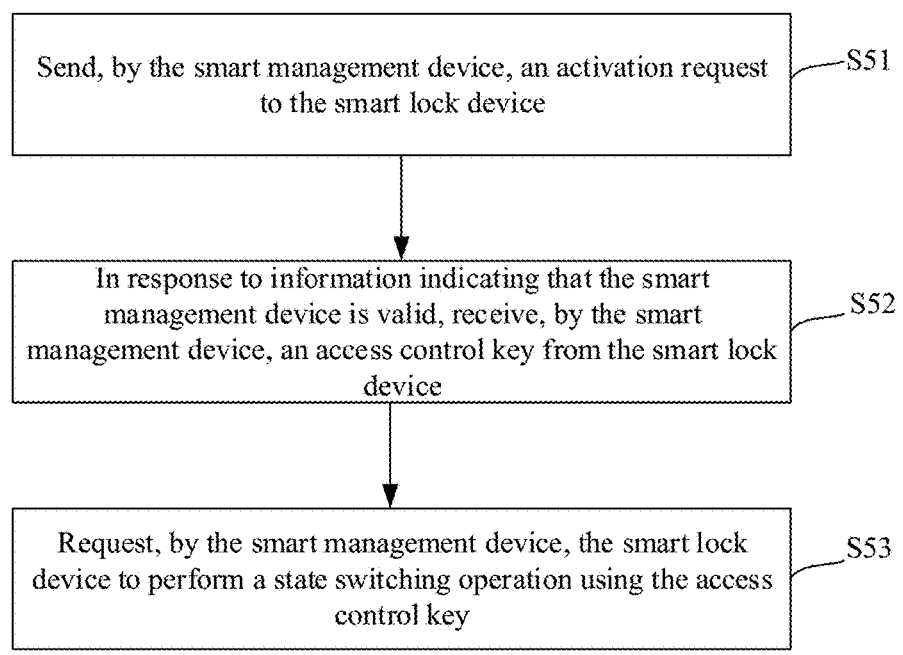
FIG. 6 is a schematic flowchart of a smart management device identification method according to some embodiments.

FIG. 6 is a flowchart of a smart management device identification method 200 according to some embodiments. One or more steps in the method 200 may be implemented in the smart lock control system 100 shown in FIG. 5. For example, one or more steps in the method 200 may be stored in a storage device as instructions and can be called and/or executed by one or more processors. In some embodiments, the one or more processors may be processors of one of the smart management devices 140, and thus the method 200 may be implemented on the smart management device 140.

In step S51, the smart management device sends an activation request to the smart lock device. The activation request is used to verify validity of the smart management device.

For example, the smart management device may send the activation request which carries signature certificate to the smart lock device.

The signature certificate used by the smart management device 140 may be obtained from the server in advance.

According to some other embodiments, the smart management device may send other credentials to the smart lock device for verifying validity of the smart management device. For example, the identifier of the smart management device and/or other information may be sent to the smart lock device for verifying validity of the smart management device.

As described above, the access management device involved in embodiments of the present disclosure may be a physical card or a virtual card installed in a device and having a smart access control card function.

In step S52, in response to information indicating that the smart management device is valid, the smart management device receives an access control key from the smart lock device.

For example, after the smart management device is authenticated by the smart lock device, the smart management device receives and stores an access control key. The access control key is generated according to a master key of the smart lock device and an identifier of the smart management device.

In step S53, the smart management device requests the smart lock device to perform a state switching operation using the access control key.

For example, when the smart management device 140 is normally used, the smart management device 140 requests the smart lock device 130 to perform a state switching operation using the stored access control key.

In some embodiments of the present disclosure, state switching may refer to switching from the current state to another state (e.g., the smart lock device may be switched from the locked state to the unlocked state). The smart management device may use the access control key to generate a state switching instruction, and the state switching instruction may include an instruction or command requesting to switch the state of the smart lock device. For example, if the smart lock device is currently locked, the smart management device can request the smart lock device to be unlocked, or electronically double-locked, by using the state switching instruction generated by the access control key. That is, based on the result of successful verification, the smart lock device performs corresponding operations in response to control instructions issued by the smart management device.

In the above embodiments of the present disclosure, after sending the activation request to the smart lock device, the smart lock device may verify validity of the smart management device. If the smart management device is valid, the smart lock device may send an access control key to the smart management device. By such procedure, a binding relationship or an association is established between the smart management device and the smart lock device. In subsequent usage, the smart management device may request the lock device to perform a state switching operation using the access control key.

As can be seen from the above, the binding relationship or an association between the smart management device and the smart lock device does not need to be established before the smart management device and the smart lock device leave factory. One smart lock device may be associated with a plurality of smart management devices. Anytime when a user wishes to associate a new smart management device, the user may send the activation request to make the smart lock device to return an access control key. In addition, if the smart management device is lost, the user may request the lock device to disable the access control key previously sent to the smart management device, preventing somebody who gets the lost smart management device from gaining access to the lock device. Also, the user may cancel the association or binding relationship between a smart management device and the lock device. The flexibility in issuing of smart management device is increased, and user experience is improved.

Figure 7:
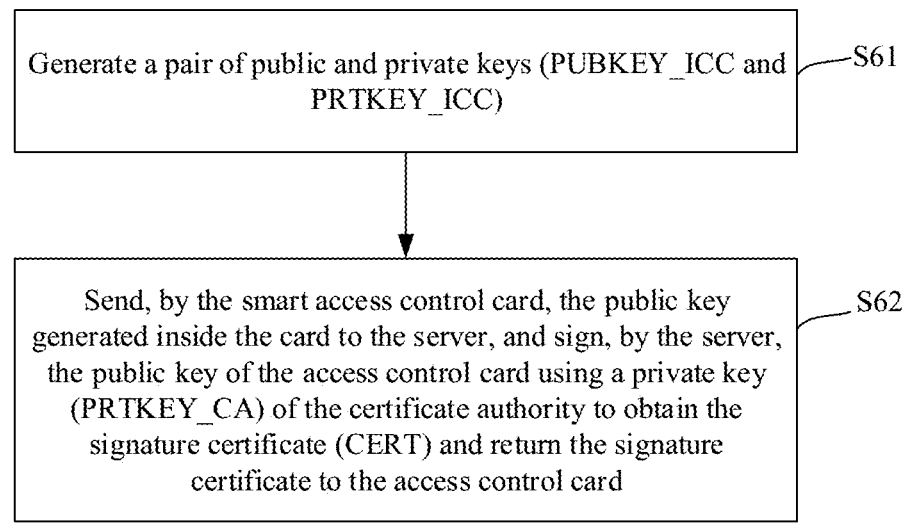
FIG. 7 is a first schematic diagram showing a preset operation of a smart management device.
Figure 8:
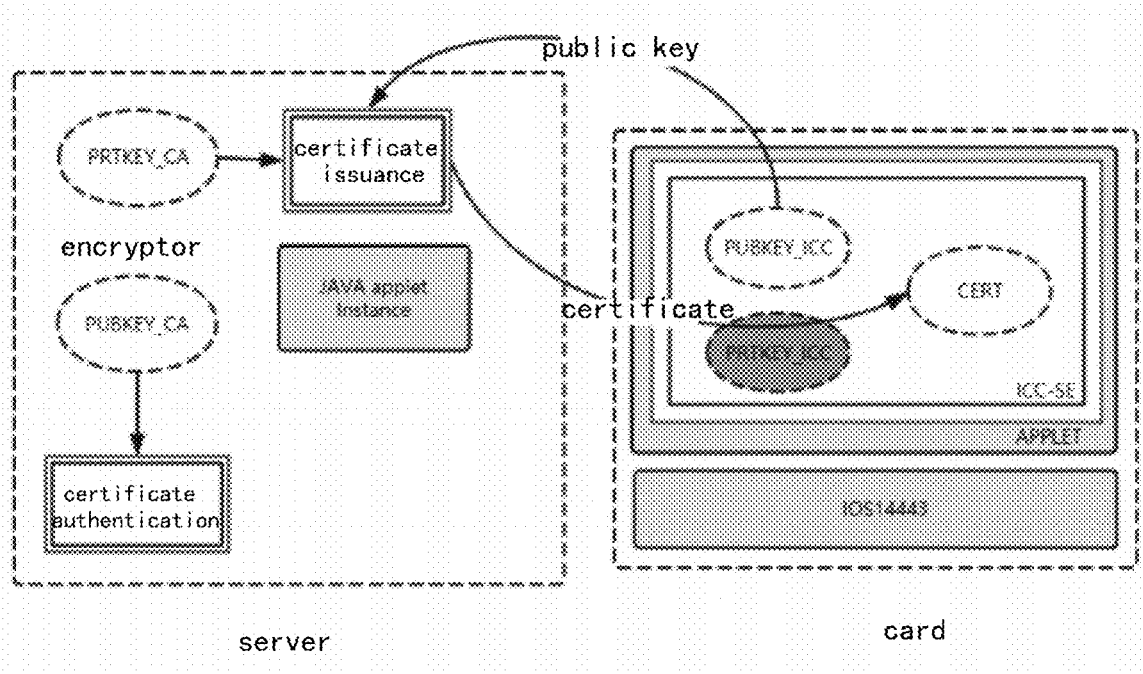
FIG. 8 is a second schematic diagram showing a preset operation of a smart management device.

Before step S51, initialization operation may be conducted in the smart management device. FIGS. 7 and 8 are schematic diagrams showing a preset operation of a smart management device before leaving the factory according to some embodiments. In this embodiment, for example, the smart management device is a physical card, and under such condition, the smart management device may be called as a smart access control card.

Some settings may be performed on the smart access control card in advance in a safe environment before the card leaves the factory, and such settings can be called as pre-settings. The pre-settings mainly include card data initialization. The following steps may be included:

In step S61, a pair of public and private keys (PUBKEY_ICC and PRTKEY_ICC) are generated inside the smart access control card. The private key is stored in a secure area and cannot be read.

In this step, a pair of public and private keys can be generated inside the smart access control card by initialization, and the public key can be used to obtain a signature certificate from a certificate authority center.

In step S62, the smart access control card sends the public key generated inside the card to the server, and the server signs the public key of the access control card using a private key (PRTKEY_CA) of the certificate authority to obtain the signature certificate (CERT) and return the signature certificate to the access control card.

The certificate authority, as a trusted third party, can solve the problem of legality verification of public keys for smart access control cards and smart lock devices. That is, the smart lock device can verify the legality of the smart access control card (also known as the validity of the smart access control card) through the signature certificate issued to the smart access control card by the certificate authority center. The certificate authority center can be considered as being integrated with the server, or the certificate authority center can be deployed in other network elements independent of the server.

After completing the above steps, the smart access control card can leave the factory and be distributed to a user. In the embodiment, there is no need to establish a binding or association relationship between the smart access control card and the smart lock device before the smart access control card leaves the factory.

In order to meet special requirements for security, the smart access control card in embodiments of the present disclosure may be a CPU card with data calculation capability plus logic encryption capability. A JAVA card is a CPU card that can run JAVA programs, has very good security and portability, and therefore the JAVA CPU card can be used as a carrier for the access control card.

As can be seen from the above exemplary embodiments, in the technical solutions of the present disclosure, the smart access control card is only pre-set before leaving the factory, and does not need to be bound with a smart lock device. Embodiments of that present disclosure separate the issuance of the smart access control card and the binding between the smart access control card and the smart lock device as two independent processes. Therefore, in subsequent usage, a user can add new cards freely, a new card can be remotely distributed, or the user can report the loss of a card in use, delete the card, and so on, without affecting the operation of the smart lock device which is associated with the smart access control card, thereby increasing the flexibility of card issuance and improving user experience.

In other embodiments, the smart management device may be an NFC device or a Bluetooth key. Similar settings as that described above may be performed on the NFC device or a Bluetooth key in advance in a safe environment before the NFC device or the Bluetooth key leaves the factory. Also, a pair of public and private keys can be generated inside the NFC device or the Bluetooth key by initialization, and the private key is stored in a secure area and cannot be read.

In other embodiments, for example, the smart management device is a device in which an application having the function of access control management is installed. For example, the smart management device may be a smart phone, a smart watch, a wearable device, or the like. The application installed in the smart management device may be applet. A pair of public and private keys (PUBKEY_ICC 和 PRTKEY_ICC) may be generated by the applet. The private key may be stored in a secure area and cannot be read. For example, the private key may be stored in a trust zone of the smart management device.

The smart management device may send the public key generated to the server, and the server signs the public key of the smart management device using a private key (PRTKEY_CA) of the certificate authority to obtain the signature certificate (CERT) and return the signature certificate to the device. In this way, the device can be used for gaining access.

Figure 9:
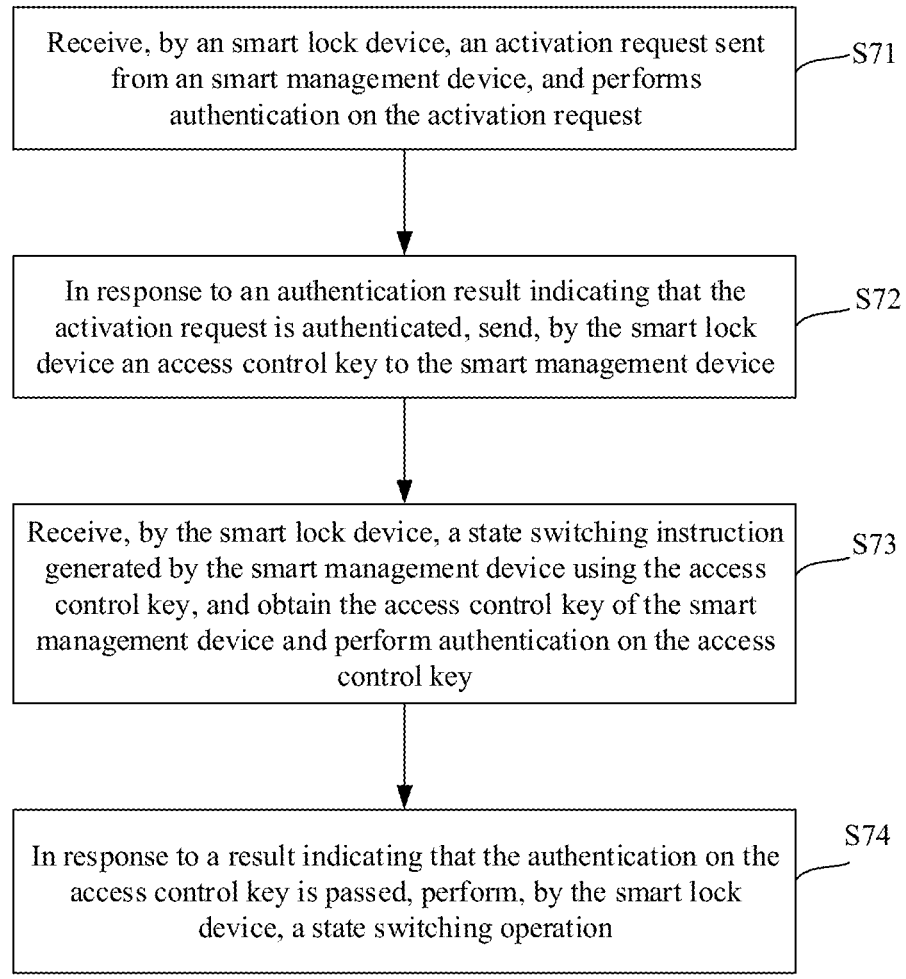
FIG. 9 is a flowchart of a smart management device identification method according to some embodiments.

FIG. 9 is a flowchart of a smart management device identification method according to some embodiments. The identification process includes the following steps:

In step S71, a smart lock device receives an activation request sent from a smart management device, and performs authentication on the activation request.

For example, when receiving an activation request from a smart management device, a smart lock device obtains a signature certificate carried in the activation request form the smart management device, and performs authentication on the signature certificate.

In some embodiments, the smart management device may send the activation request to the smart lock device via near field communication.

In some other embodiments, the smart management device may send the activation request to the smart lock device via Bluetooth.

In step S72, in response to an authentication result indicating that the activation request is authenticated, the smart lock device sends an access control key to the smart management device.

For example, if authentication on the signature certificate is passed, the smart lock device sends the access control key to the smart management device.

For example, the smart lock may obtain the identifier of the smart management device, generates the access control key according to a master key (which may be locally stored) of the smart lock device and the identifier of the smart management device, and sends the generated access control key to the smart management device.

In step S73, the smart lock device receives a state switching instruction generated by the smart management device using the access control key, and obtains the access control key of the smart management device and performs authentication on the access control key.

For example, when the smart lock device receives a state switching instruction generated by the smart management device using the access control request, the smart lock device obtains the access control key and performs authentication on the access control key.

In step S74, in response to a result indicating that the authentication on the access control key is passed, the smart lock device performs a state switching operation.

For example, if the authentication on the access control key of the smart management device is passed by the smart lock device, the smart lock device performs a state switching operation. For example, if the smart lock device is currently in a locked state, the smart lock device may perform unlocking operation after the authentication on the access control key is passed by the smart lock device.

Figure 10:
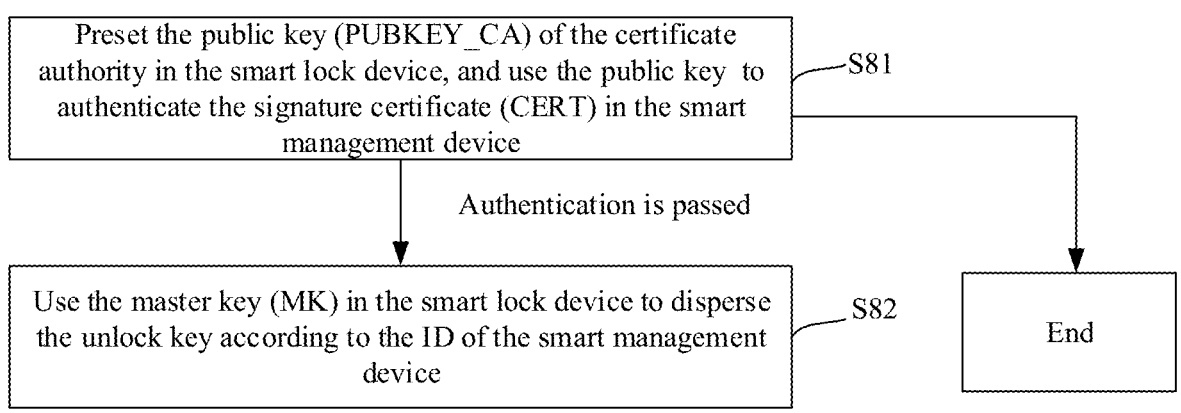
FIG. 10 is a first schematic diagram showing the principle of activation of a smart management device before the smart management device is used.
Figure 11:
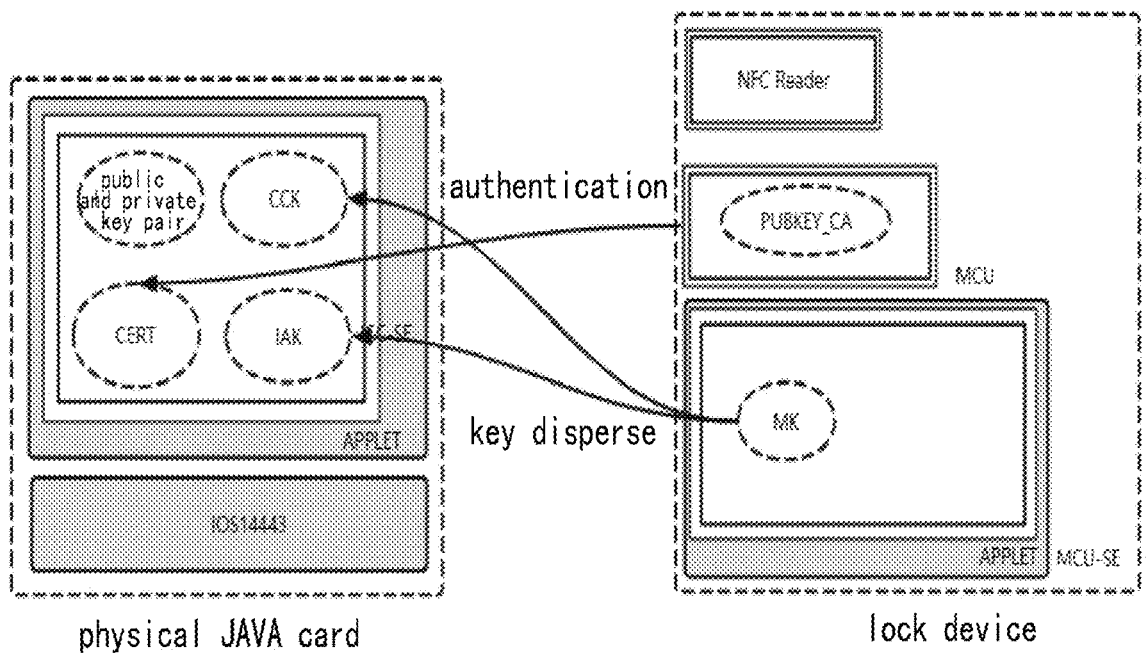
FIG. 11 is a second schematic diagram showing the principle of activation of a smart management device before the smart management device is used.

As can be seen from the above steps S71 and S72, before the smart lock authenticates the smart management device, the smart management device needs to be activated. After the smart management device is activated, the smart lock device and the smart management device card are bound or associated one another. FIGS. 10 and 11 are schematic diagrams showing the principle of activation of a smart management device before the smart management device is used. The main purpose of activation is to verify the validity of the smart management device and distribute the key used for unlocking (access control key) to form the binding relationship between the smart management device and the smart lock device. The activation process includes the following steps:

In step S81, the public key (PUBKEY_CA) of the certificate authority in the server is preset in the smart lock device, and the public key is used to authenticate the signature certificate (CERT) in the smart management device. If the authentication is passed, the smart management device is considered valid and step S82 is performed. If the authentication fails, the smart management device is considered invalid and the process ends.

In step S82, the master key (MK) in the smart lock device is used to disperse the access control key according to the ID of the smart management device. The access control key can include IAK (internal authentication key) and CCK (external authentication key), and can be written to the smart management device.

In this step, the smart lock device can use a preset encryption algorithm to calculate the IAK and CCK corresponding to the smart management device based on the MK of the lock device and the ID of the smart management device.

As can be seen from the above description, during the activation process, an association is formed between the smart management device and the smart lock device, and the smart lock device distributes the key to the smart management device. Thus, the association between the smart management device and the smart lock device is more flexible and has higher security. For example, when a new smart access control card is issued, it is only necessary to add an association between the smart access control card and the smart lock device, and it is not needed to set an access control key in the newly added smart access control card.

Figure 12:
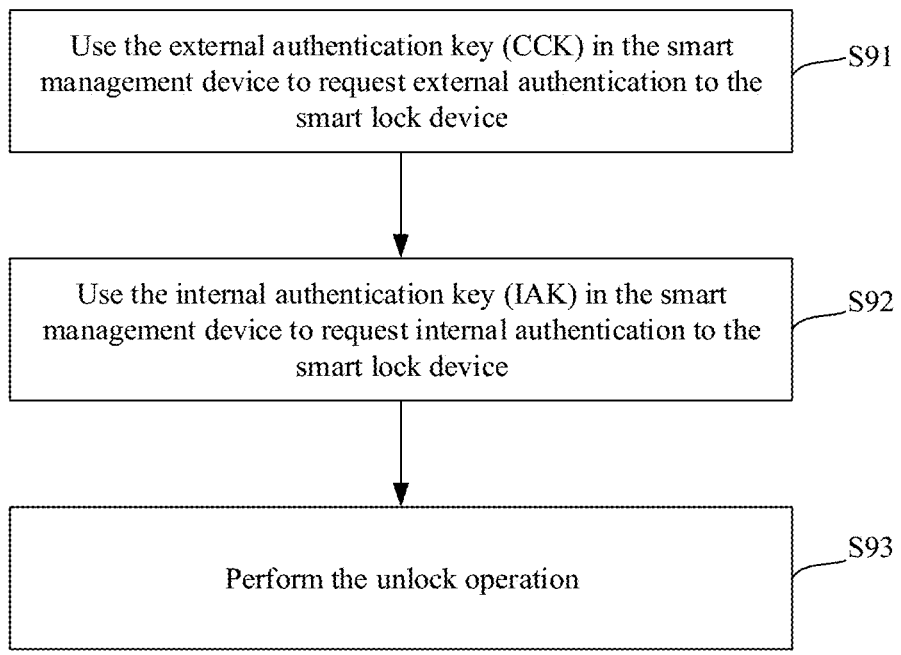
FIG. 12 is a first schematic diagram showing a principle of unlocking after a smart management device is activated according to some embodiments.
Figure 13:
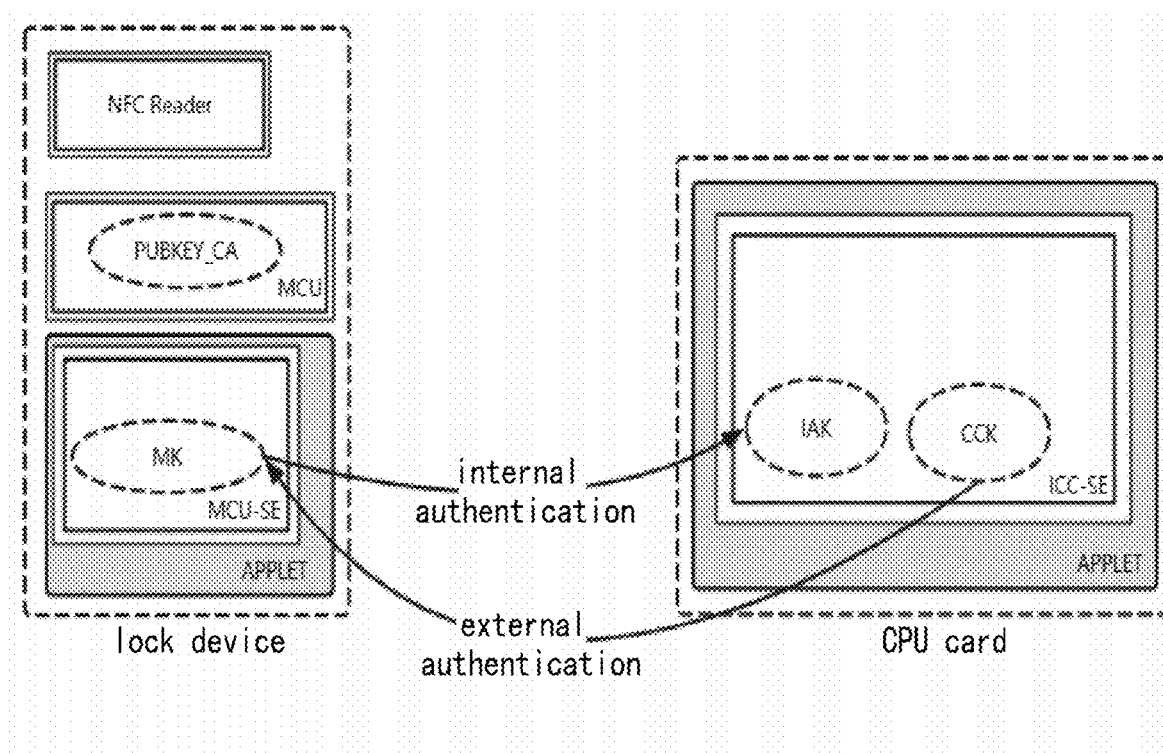
FIG. 13 is a second schematic diagram showing a principle of unlocking after a smart management device is activated according to some embodiments.

In the above examples, when the smart lock device receives a state switching operation request from the smart management device, the smart lock device obtains and authenticates the access control key of the smart management device. When the access control key of the smart management device is authenticated by the smart lock device, the smart lock can perform the state switching operation. FIGS. 12 and 13 are schematic diagrams showing a principle of unlocking after a smart management device is activated according to some embodiments. The process includes the following steps:

In step S91, the smart management device uses the external authentication key (CCK) in the smart management device to request external authentication to the smart lock device. The smart lock device performs encryption calculation based on the ID of the smart management device and MK of the smart lock device. If the calculated key is consistent with the CCK, the external authentication is passed, and step S92 is performed. If the calculated key is inconsistent with the CCK, the external authentication fails, and the smart lock device may provide a prompt which indicates that unlocking has failed.

In step S92, the smart management device uses the internal authentication key (IAK) in the smart management device to request internal authentication to the smart lock device. The smart lock performs encryption calculation based on the ID of the smart management device and MK of the smart lock device. If the calculated key is consistent with that IAK, the internal authentication is passed, and step S93 is performed. If the calculated key is inconsistent with the IAK, the internal authentication fails, and the smart lock device may provide a prompt which indicates that unlocking has failed.

In step S93, the authentication is passed, and the unlock operation is performed.

In some applications, the smart management device can use 8-byte random number and send it to the smart lock device for external authentication. The smart lock device can determine the CCK of the smart management device based on the local MK and the ID of the smart management device, and use the CCK to encrypt the 8-byte random number and send the ciphertext to the smart management device. The smart management device uses the CCK of the smart management device to decrypt the ciphertext sent by the smart lock device to obtain an 8-byte random number to be verified. If the decrypted 8-byte random number to be verified is the same as the 8-byte random number in the smart management device, the external authentication is passed.

Correspondingly, the smart lock device can also use an 8-byte random number and send it to the smart management device for internal authentication. The smart management device uses the IAK of the smart management device to encrypt the received 8-byte random number, and send the obtained ciphertext to the smart lock device. The smart lock device can determine the IAK of the smart management device based on the local MK and the ID of the smart management device. The IAK of the smart management device is used to decrypt the ciphertext sent by the smart management device to obtain an 8-byte random number to be verified. If the decrypted 8-byte random number to be verified is the same as the 8-byte random number in the smart lock device, the internal authentication is passed.

As can be seen from the above description, in the technical solutions of the present disclosure, the smart management device uses the access control key distributed by the smart lock device which is acquired during the activation process to request the smart lock device to perform the state switching operation, and the access control key is related to the master key of the smart lock device and the ID of the smart management device. That is, the key is only related to the information of the smart lock device and the smart management device, and does not involve any third-party information. Therefore, by using the key, the security of the smart management device is greatly improved.

Figure 14:
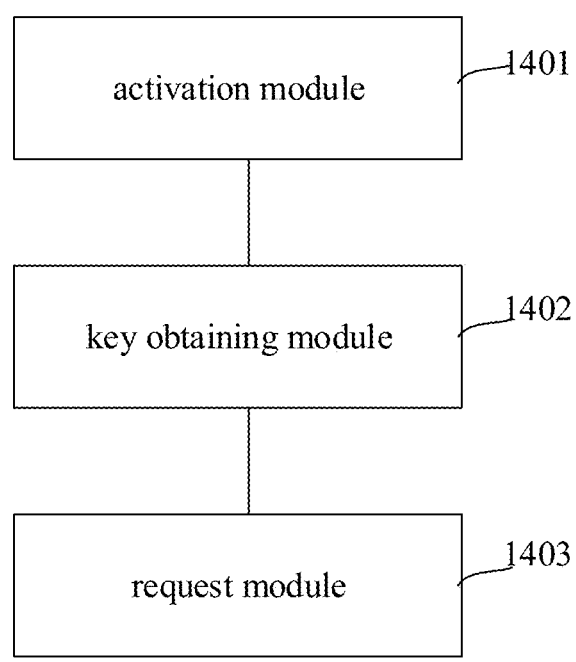
FIG. 14 is a schematic diagram of a smart management device according to some embodiments.

FIG. 14 is a schematic diagram of a smart management device according to some embodiments. The smart management device includes an activation module 1401, a key obtaining module 1402, and a request module 1403.

The activation module 1401 is configured to send an activation request to a smart lock device. The activation request is used to verify validity of the smart management device.

For example, the activation request may include a signature certificate (CERT) issued by a server. The smart lock device may verify the CERT.

The key obtaining module 1402 is configured to, in response to information indicating that the smart management device is valid, receive an access control key from the smart lock device, wherein the access control key is generated according to a master key of the smart lock device and an identifier of the smart management device.

For example, the access control key may include external authentication key CCK and internal authentication key IAK.

In this example, CCK and IAK can be calculated by performing a preset encryption algorithm based on the master key MK of the smart lock and the ID of the smart management device.

The request module 1403 is configured to request the smart lock device to perform a state switching operation using the access control key.

For example, the smart management device may use the CCK and IAK stored by the key obtaining module to unlock the smart lock device.

The CERT can be obtained from the server in advance. The CERT can be obtained through an independent module, for example, a preset module, which sends the public key generated by the smart management device by initialization to the server, receives and stores the signature certificate CERT returned by the server. The server generates the CERT by signing the public key of the smart access control card using the private key PRTKEY_CA of the certificate authority.

The smart management device can be a CPU card with data calculation capability and logic encryption capability. For example, JAVA CPU card, that is, a CPU card that can run JAVA programs, can be used as the smart management device.

The smart management device can also be in the form of a virtual card, for example, a device in which an application (e.g., applet) with a smart access control card function can be installed in a mobile terminal.

Alternatively, the smart management device can be an NFC card or a Bluetooth key.

According to some embodiments, the activation module 1401 is configured to send the activation request which carries a signature certificate to the smart lock device.

According to some embodiments, the smart device further includes a sending module configured to send a public key generated in the smart management device to a server, and receiving and storing a signature certificate returned by the server, wherein the server generates the signature certificate by signing the public key of the smart management device using a private key of a certificate authority center.

According to some embodiments, access control key comprises an external authentication key and an internal authentication key, and the key obtaining module 1402 is configured to:

send the identifier of the smart management device to the smart lock device;

and receive the external authentication key and the internal authentication key issued by the smart lock device, wherein the external authentication key and the internal authentication key are obtained by calculation using a preset encryption algorithm according to a master key of the smart lock device and an identifier of the smart management device.

According to some embodiments, the request module is configured to:

request to perform an external authentication with the smart lock device using the external authentication key;

request to perform an internal authentication with the smart lock device using the internal authentication key.

Regarding operations of modules in the smart management device in the above embodiments, details can be found in the previous method embodiments and repeated descriptions are omitted here.

Figure 15:
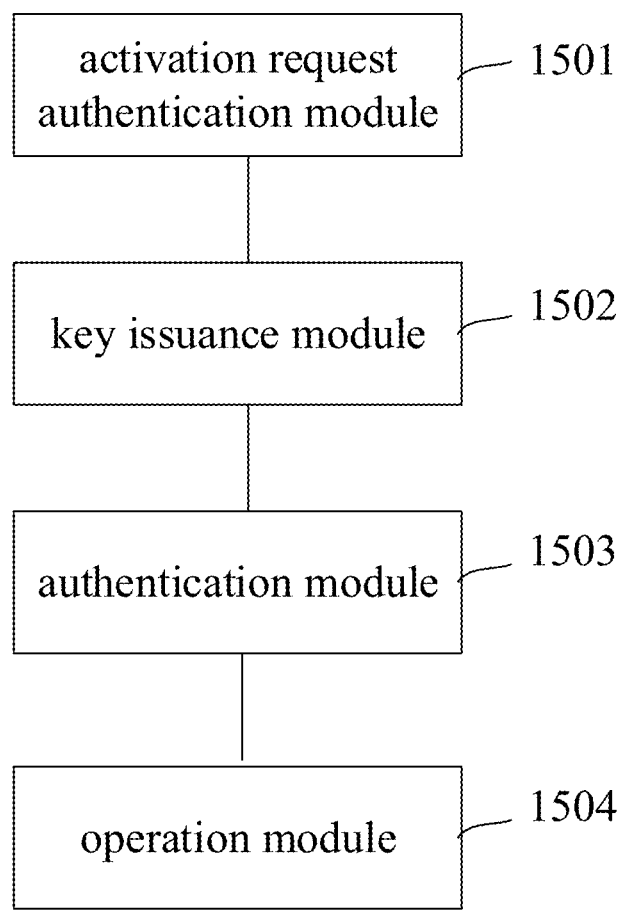
FIG. 15 is a schematic diagram of a smart lock device according to some embodiments.

FIG. 15 is a schematic structural diagram of a smart lock device according to some embodiments. The smart lock device can be used in conjunction with the above-mentioned smart access control card. The smart door lock device includes an activation request authentication module 1501, a key issuance module 1502, and authentication module 1503 and an operation module 1504.

The activation request authentication module 1501 is configured to receive an activation request sent from a smart management device, and perform authentication on the activation request.

For example, when an activation request from a smart management device is received, a signature certificate CERT in the smart management device may be obtained, and authentication may be performed on the signature certificate.

In this example, the public key PUBKEY_CA of the certificate authority in the server pre-stored in the smart lock device may be used to authenticate the CERT sent from the smart management device.

The key issuance module 1502 is configured to, in response to an authentication result indicating that the activation request is authenticated, send an access control key (which may include CCK and IAK) to the smart management device.

The procedure for the key issuance module 1502 to issue the CCK and IAK may include the following operations:

The lock device obtains the ID of the smart management device.

The lock uses the master key MK of the smart lock and the ID of the smart management device to set the CCK and IAK used for unlocking for the smart access control card through a preset encryption algorithm and writes the CCK and IAK into the smart management device.

The authentication module 1503 is configured receive a state switching instruction generated by the smart management device using the access control key, and obtain the access control key of the smart management device and perform authentication on the access control key.

The operation module 1504 is configured to, in response to a result indicating that the authentication on the access control key is passed, perform a state switching operation.

Alternatively, if the access control key does not pass the authentication, the smart lock device may maintain the locked state to prevent the smart management device from gaining access to the lock device.

According to some embodiments, the activation request authentication module 1501 is configured to perform authentication on a signature certificate carried in the activation request using a public key of a certificate authority center.

According to some embodiments, key issuance module 1502 is configured to obtain an identifier of the smart management device; generate the access control key according to a master key of the smart lock device and the identifier of the smart management device; and send the generated access control key to the smart management device.

Regarding operations of modules in the terminal in the above embodiments, details can be found in the previous method embodiments and repeated descriptions are omitted here.

According to some embodiments, there is provided a smart management device, comprising:
a processor;
memory for storing instructions executable by the processor;
wherein the processor is configured to:
send an activation request to a smart lock device, wherein the activation request is used to verify validity of the smart management device;
in response to information indicating that the smart management device is valid, receive an access control key from the smart lock device, wherein the access control key is generated according to a master key of the smart lock device and an identifier of the smart management device; and
request the smart lock device to perform a state switching operation using the access control key.

According to some embodiments, the processor is configured to:
send the activation request which carries a signature certificate to the smart lock device.

According to some embodiments, the activation request is sent to the smart lock device via near field communication or Bluetooth.

According to some embodiments, the processor is further configured to:
send a public key generated in the smart management device to a server, and receive and store a signature certificate returned by the server, wherein the server generates the signature certificate by signing the public key of the smart management device using a private key of a certificate authority center.

According to some embodiments, the access control key comprises an external authentication key and an internal authentication key;
wherein the processor is configured to:
send the identifier of the smart management device to the smart lock device; and
receive the external authentication key and the internal authentication key issued by the smart lock device, wherein the external authentication key and the internal authentication key are obtained by calculation using a preset encryption algorithm according to a master key of the smart lock device and an identifier of the smart management device.

According to some embodiments, the processor is configured to:
request to perform an external authentication with the smart lock device using the external authentication key;
request to perform an internal authentication with the smart lock device using the internal authentication key.

According to some embodiments, the smart management device is a CPU card with data calculation capability and logic encryption capability.

According to some embodiments, the CPU card is a JAVA CPU card.

According to some embodiments, the smart management device is a device in which an application having a function of access control management is installed.

According to some embodiments, the application is an applet installed in the smart management device.

The operations performed by the processor have been described in the previous method embodiments and repeated descriptions are omitted here.

According to some embodiments, there is provided a smart lock device, comprising:
a processor;
memory for storing instructions executable by the processor;
wherein the processor is configured to:
receive an activation request sent from a smart management device, and perform authentication on the activation request;
in response to an authentication result indicating that the activation request is authenticated, send an access control key to the smart management device;
receive a state switching instruction generated by the smart management device using the access control key, and obtain the access control key of the smart management device and perform authentication on the access control key; and
in response to a result indicating that the authentication on the access control key is passed, perform a state switching operation.

According to some embodiments, the processor is configured to:
perform authentication on a signature certificate carried in the activation request using a public key of a certificate authority center.

According to some embodiments, the processor is configured to:
obtain an identifier of the smart management device;
generate the access control key according to a master key of the smart lock device and the identifier of the smart management device; and send the generated access control key to the smart management device.

The memory in embodiments of the present disclosure may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

According to some embodiments, there is provided a non-transitory computer-readable storage medium, wherein when instructions in the storage medium are executed by a processor of a smart management device, the smart management device performs the smart management device identification method described in the previous embodiments.

According to some embodiments, there is provided a non-transitory computer-readable storage medium, wherein when instructions in the storage medium are executed by a processor of a smart lock device, the smart lock device performs the smart management device identification method described in the previous embodiments.

The instructions in the non-transitory computer-readable storage medium may also be executed by a processor of a mobile terminal with a smart access control card function. In this case, the smart access control card may be regarded as a virtual card installed in the mobile terminal.

Regarding the non-transitory computer-readable storage medium in the above embodiments, the specific manner in which the instructions in the storage medium cause the smart access card to perform operations is described in detail in the method embodiments, and descriptions are not repeated here.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks;

magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A smart management device identification method, applied in a smart phone in which applet is installed, comprising:
   generating by the applet a pair of a public key and a private key;
   storing the private key in a trust zone of the smart phone;
   sending, by the smart phone, the public key generated in the applet to a server, and receiving and storing a signature certificate returned by the server, wherein the server generates the signature certificate by signing the public key of the smart phone using a private key of a certificate authority center;
   sending, by the smart phone, an activation request to a smart lock device, wherein the activation request is used to verify validity of the smart phone, wherein the activation request carries the signature certificate to the smart lock device;
   in response to information indicating that the smart phone is valid, receiving, by the smart phone, an access control key from the smart lock device, wherein the access control key is generated according to a master key of the smart lock device and an identifier of the smart phone; and
   requesting, by the smart phone, the smart lock device to perform a state switching operation using the access control key;
   wherein the access control key comprises an external authentication key and an internal authentication key, and the receiving, by the smart phone, the access control key comprises:
   sending, by the smart phone, the identifier of the smart phone to the smart lock device; and
   receiving, by the smart phone, the external authentication key and the internal authentication key issued by the smart lock device, wherein the external authentication key and the internal authentication key are obtained by calculation using a preset encryption algorithm according to the master key of the smart lock device and the identifier of the smart phone;
   wherein the requesting, by the smart phone, the smart lock device to perform a state switching operation using the access control key comprises:
   sending, by the smart phone, first 8-byte random number to the smart lock device;
   receiving, by the smart phone, ciphertext obtained by the smart lock device using the external authentication key to encrypt the first 8-byte random number;
   using, by the smart phone, the external authentication key to decrypt the ciphertext to obtain a decrypted 8-byte random number,
   responsive to that the decrypted 8-byte random number is same as the first 8-byte random number, determining that an external authentication is passed;
   receiving, by the smart phone, a second 8-byte random number sent by the smart lock device;
   using, by the smart phone, the internal authentication key to encrypt the second 8-byte random number to obtain ciphertext;
   sending, by the smart phone, the ciphertext to the smart lock device, so that the smart lock device decrypts the ciphertext sent by the smart phone to obtain a decrypted 8-byte random number to be verified, and if the decrypted 8-byte random number is the same as the second 8-byte random number, an internal authentication is passed.

2. The method according to claim 1, wherein the activation request is sent to the smart lock device via near field communication or Bluetooth.

3. A smart phone identification method, comprising:
   receiving, by a smart lock device, an activation request sent from a smart phone, and performing authentication on the activation request, wherein the activation request carries a signature certificate, and the signature certificate is obtained by the smart phone from a server, and the server generates the signature certificate by signing a public key of the smart phone using a private key of a certificate authority center, and the public key and a private key of the smart phone are generated by the smart phone using an applet, and the private key of the smart phone is stored in a trust zone of the smart phone;
   in response to an authentication result indicating that the activation request is authenticated, sending, by the smart lock device, an access control key to the smart phone, wherein the access control key is generated according to a master key of the smart lock device and an identifier of the smart phone;
   receiving a state switching instruction generated by the smart phone using the access control key, and obtaining, by the smart lock device, the access control key of the smart phone and performing authentication on the access control key; and in response to a result indicating that the authentication on the access control key is passed, performing, by the smart lock device, a state switching operation;

wherein the access control key comprises an external authentication key and an internal authentication key, and the sending, by the smart lock device, the access control key to the smart phone comprises:

obtaining, by the smart lock device, the identifier of the smart phone; and sending, by the smart lock device, the external authentication key and the internal authentication key issued by the smart lock device to the smart phone, wherein the external authentication key and the internal authentication key are generated by calculation using a preset encryption algorithm according to the master key of the smart lock device and the identifier of the smart phone;

wherein the performing authentication on the access control key comprises:

receiving, by the smart lock device, first 8-byte random number sent by the smart phone;

using, by the smart lock device, the external authentication key to encrypt the first 8-byte random number to obtain ciphertext;

sending, by the smart lock device, the ciphertext to the smart phone, so that the smart phone decrypts the ciphertext sent by the smart lock device to obtain a decrypted 8-byte random number to be verified, and if the decrypted 8-byte random number is the same as the first 8-byte random number, an external authentication is passed;

sending, by the smart lock device, a second 8-byte random number to the smart phone;

receiving, by the smart lock device, ciphertext obtained by the smart phone using the internal authentication key to encrypt the first 8-byte random number;

using, by the smart lock device, the internal authentication key to decrypt the ciphertext to obtain a decrypted 8-byte random number, responsive to that the decrypted 8-byte random number is same as the second 8-byte random number, determining that an internal authentication is passed.

4. The method according to claim 3, wherein the performing, by the smart lock device, authentication on the activation request, comprises:

performing, by the smart lock device, authentication on the signature certificate carried in the activation request using a public key of a certificate authority center.

5. A smart phone, on which an applet is installed comprising:

a processor;

memory for storing instructions executable by the processor;

wherein the processor is configured to:

generate, using the applet, a pair of a public key and a private key;

store the private key in a trust zone of the smart phone;

send the public key generated in the applet to a server, and receiving and storing a signature certificate returned by the server, wherein the server generates the signature certificate by signing the public key of the smart phone using a private key of a certificate authority center;

send an activation request to a smart lock device, wherein the activation request is used to verify validity of the smart phone, wherein the activation request carries the signature certificate to the smart lock device;

in response to information indicating that the smart phone is valid, receive an access control key from the smart lock device, wherein the access control key is generated according to a master key of the smart lock device and an identifier of the smart phone; and request the smart lock device to perform a state switching operation using the access control key;

wherein the access control key comprises an external authentication key and an internal authentication key;

wherein the processor is further configured to:

send the identifier of the smart phone to the smart lock device; and receive the external authentication key and the internal authentication key issued by the smart lock device, wherein the external authentication key and the internal authentication key are obtained by calculation using a preset encryption algorithm according to the master key of the smart lock device and the identifier of the smart phone;

wherein the processor is further configured to:

send first 8-byte random number to the smart lock device;

receive ciphertext obtained by the smart lock device using the external authentication key to encrypt the first 8-byte random number;

use the external authentication key to decrypt the ciphertext to obtain a decrypted 8-byte random number, responsive to that the decrypted 8-byte random number is the same as the first 8-byte random number, determine that an external authentication is passed;

receive a second 8-byte random number sent by the smart lock device;

use the internal authentication key to encrypt the second 8-byte random number to obtain ciphertext;

send the ciphertext to the smart lock device, so that the smart lock device decrypts the ciphertext sent by the smart phone to obtain a decrypted 8-byte random number to be verified, and if the decrypted 8-byte random number is the same as the second 8-byte random number, an internal authentication is passed.

6. A smart lock device, comprising:

a processor;

memory for storing instructions executable by the processor;

wherein the processor is configured to:

receive an activation request sent from a smart phone, and perform authentication on the activation request, wherein the activation request carries a signature certificate, and the signature certificate is obtained by the smart phone from a server, and the server generates the signature certificate by signing a public key of the smart phone using a private key of a certificate authority center, and the public key and a private key of the smart phone are generated by the smart phone using an applet, and the private key of the smart phone is stored in a trust zone of the smart phone;

in response to an authentication result indicating that the activation request is authenticated, send an access control key to the smart phone, wherein the access control key is generated according to a master key of the smart lock device and an identifier of the smart phone;

receive a state switching instruction generated by the smart phone using the access control key, and obtain the access control key of the smart phone and perform authentication on the access control key; and in response to a result indicating that the authentication on the access control key is passed, perform a state switching operation,
wherein the access control key comprises an external authentication key and an internal authentication key;
wherein the processor is further configured to:
obtain the identifier of the smart phone; and
send the external authentication key and the internal authentication key issued by the smart lock device to the smart phone, wherein the external authentication key and the internal authentication key are generated by calculation using a preset encryption algorithm according to the master key of the smart lock device and the identifier of the smart phone;
wherein the processor is further configured to:
receive first 8-byte random number sent by the smart phone;
use the external authentication key to encrypt the first 8-byte random number to obtain ciphertext;
send the ciphertext to the smart phone, so that the smart phone decrypts the ciphertext sent by the smart lock device to obtain a decrypted 8-byte random number to be verified, and if the decrypted 8-byte random number is the same as the first 8-byte random number, an external authentication is passed;
send a second 8-byte random number to the smart phone;
receive ciphertext obtained by the smart phone using the internal authentication key to encrypt the first 8-byte random number;
use the internal authentication key to decrypt the ciphertext to obtain a decrypted 8-byte random number,
responsive to that the decrypted 8-byte random number is the same as the second 8-byte random number, determine that an internal authentication is passed.

7. The smart lock device according to claim 6, wherein the processor is configured to:
perform authentication on the signature certificate carried in the activation request using a public key of a certificate authority center.

8. A smart lock system implementing the method of claim 1, comprising the smart phone and the smart lock device, wherein the smart lock device is configured to:
receive the activation request sent from the smart phone, and perform authentication on the activation request;
in response to an authentication result indicating that the activation request is authenticated, send-the access control key to the smart phone;
receive a state switching instruction generated by the smart phone using the access control key, and obtain the access control key of the smart phone and perform authentication on the access control key; and
in response to a result indicating that the authentication on the access control key is passed, perform a state switching operation;
wherein the access control key comprises an external authentication key and an internal authentication key;
wherein the smart lock device is further configured to:
obtain the identifier of the smart phone; and
send the external authentication key and the internal authentication key issued by the smart lock device to the smart phone, wherein the external authentication key and the internal authentication key are generated by calculation using a preset encryption algorithm according to the master key of the smart lock device and the identifier of the smart phone;
wherein the smart lock device is further configured to:
receive first 8-byte random number sent by the smart phone;
use the external authentication key to encrypt the first 8-byte random number to obtain ciphertext;
send the ciphertext to the smart phone, so that the smart phone decrypts the ciphertext sent by the smart lock device to obtain a decrypted 8-byte random number to be verified, and if the decrypted 8-byte random number is the same as the first 8-byte random number, an external authentication is passed;
send a second 8-byte random number to the smart phone;
receive ciphertext obtained by the smart phone using the internal authentication key to encrypt the first 8-byte random number;
use the internal authentication key to decrypt the ciphertext to obtain a decrypted 8-byte random number,
responsive to that the decrypted 8-byte random number is the same as the second 8-byte random number, determine that an internal authentication is passed;
wherein the smart phone uses the access control key distributed by the smart lock device that is acquired during the activation process to request the smart lock device to perform the state switching operation, and the access control key is related to the master key of the smart lock device and an identification of the smart phone, such the key is only related to the information of the smart lock device and the smart phone, and does not involve third-party information, thereby improving security of the smart phone.

* * * * *